United States Patent
Brunnhofer

(10) Patent No.: US 7,743,940 B2
(45) Date of Patent: Jun. 29, 2010

(54) DOUBLE-WALLED CONTAINER HAVING SUPPORTS FOR POSITIONING THE INNER AND OUTER WALLS

(75) Inventor: Klaus Brunnhofer, Graz (AT)

(73) Assignee: Magna Steyr Fahrezeugtechnik AG & Co. KG, Graz (AT)

( * ) Notice: Subject to any disclaimer, the term of this patent is extended or adjusted under 35 U.S.C. 154(b) by 659 days.

(21) Appl. No.: 10/545,747

(22) PCT Filed: Feb. 18, 2004

(86) PCT No.: PCT/AT2004/000048

§ 371 (c)(1),
(2), (4) Date: Dec. 16, 2005

(87) PCT Pub. No.: WO2004/074737

PCT Pub. Date: Sep. 2, 2004

(65) Prior Publication Data

US 2006/0169704 A1      Aug. 3, 2006

(30) Foreign Application Priority Data

Feb. 18, 2003     (AT)     ................. GM 96/2003

(51) Int. Cl.
F17C 1/06 (2006.01)
F17C 1/08 (2006.01)
F17C 3/10 (2006.01)
F17C 1/02 (2006.01)

(52) U.S. Cl. ............ 220/560.1; 220/589; 220/590; 220/592; 220/592.27; 220/4.13; 220/918

(58) Field of Classification Search ............ 220/560.04, 220/560.09, 560.1, 560.11, 560.12, 581, 220/586, 592.27, 4.12–4.14, 560.14, 562, 220/564, 585, 589, 590, 591, 592, 918, 919, 220/921; 244/172.3
See application file for complete search history.

(56) References Cited

U.S. PATENT DOCUMENTS

| | | | | |
|---|---|---|---|---|
| 3,122,000 A | * | 2/1964 | Sirocky | 62/45.1 |
| 3,168,817 A | * | 2/1965 | Beckman et al. | 62/45.1 |
| 3,289,423 A | * | 12/1966 | Berner et al. | 62/45.1 |
| 3,341,051 A | * | 9/1967 | Forman et al. | 220/560.15 |
| 3,357,594 A | * | 12/1967 | Grosh et al. | 220/683 |
| 3,372,075 A | * | 3/1968 | Holt et al. | 156/172 |
| 3,392,865 A | | 7/1968 | Dryden | |
| 3,487,971 A | * | 1/1970 | Gay et al. | 220/560.1 |
| 3,695,483 A | * | 10/1972 | Pogorski | 220/592.26 |
| 3,698,588 A | * | 10/1972 | Pogorski | 220/592.26 |
| 3,762,175 A | * | 10/1973 | Jones | 62/45.1 |
| 3,799,385 A | * | 3/1974 | Maree et al. | 220/560.11 |
| 3,814,275 A | * | 6/1974 | Lemons | 220/562 |
| 3,815,773 A | * | 6/1974 | Duvall et al. | 220/590 |
| 3,937,781 A | * | 2/1976 | Allen | 264/314 |
| 4,170,952 A | * | 10/1979 | McCown | 114/74 A |

(Continued)

FOREIGN PATENT DOCUMENTS

GB        2089950 A  *  6/1982

*Primary Examiner*—Anthony Stashick
*Assistant Examiner*—Ned A Walker
(74) *Attorney, Agent, or Firm*—Bachman & LaPointe, P.C.

(57) ABSTRACT

A container for cryogenic liquids comprises an inner container and an outer container which are positioned with respect to each other and are thermally decoupled from each other by a vacuum insulation layer. In order, with the lowest possible weight and lowest possible costs in series production, to achieve the best possible heat insulation, the inner container and the outer container are in each case composed of prepared fiber-reinforced elements which are in each case wrapped up together with a filament and are thereby connected to one another, and supports which are also composed of a fiber-reinforced plastic are provided on the inner container for the relative positioning of the inner container with respect to the outer container.

6 Claims, 3 Drawing Sheets

U.S. PATENT DOCUMENTS

| | | | | |
|---|---|---|---|---|
| 4,394,931 A * | 7/1983 | Cotgreave et al. | | 220/560.11 |
| 4,496,073 A * | 1/1985 | Silver et al. | | 220/560.11 |
| 4,514,450 A * | 4/1985 | Nowobilski et al. | | 428/120 |
| 4,579,249 A * | 4/1986 | Patterson et al. | | 220/560.12 |
| 4,660,738 A * | 4/1987 | Ives | | 220/567.1 |
| 4,674,674 A * | 6/1987 | Patterson et al. | | 228/176 |
| 4,747,513 A * | 5/1988 | Betille et al. | | 220/560.12 |
| 4,773,952 A * | 9/1988 | Wesley, Jr. | | 156/191 |
| 4,785,956 A * | 11/1988 | Kepler et al. | | 220/590 |
| 4,793,491 A * | 12/1988 | Wolf et al. | | 206/509 |
| 4,821,914 A * | 4/1989 | Owen et al. | | 220/592.21 |
| 4,925,046 A * | 5/1990 | Sharp | | 220/4.12 |
| 4,933,040 A * | 6/1990 | Wesley, Jr. | | 156/191 |
| 4,944,251 A * | 7/1990 | Fetterly | | 122/451 R |
| 4,977,952 A * | 12/1990 | Schatz | | 165/10 |
| 4,982,856 A * | 1/1991 | Stokes | | 220/567.3 |
| 5,150,812 A * | 9/1992 | Adams | | 220/589 |
| 5,167,352 A * | 12/1992 | Robbins | | 220/62.2 |
| 5,228,585 A * | 7/1993 | Lutgen et al. | | 220/4.14 |
| 5,232,119 A * | 8/1993 | Kauffman | | 220/567.1 |
| 5,263,604 A * | 11/1993 | Metz | | 220/560.05 |
| 5,284,996 A * | 2/1994 | Vickers | | 588/249 |
| 5,287,987 A * | 2/1994 | Gaiser | | 220/589 |
| 5,308,423 A * | 5/1994 | Kauffman | | 156/171 |
| 5,346,570 A * | 9/1994 | Warden et al. | | 156/191 |
| 5,368,670 A * | 11/1994 | Kauffman | | 156/171 |
| 5,379,507 A * | 1/1995 | Lindahl | | 29/460 |
| 5,499,739 A * | 3/1996 | Greist et al. | | 220/589 |
| 5,522,340 A * | 6/1996 | Skogman | | 114/357 |
| 5,556,601 A * | 9/1996 | Huvey et al. | | 156/172 |
| 5,575,875 A * | 11/1996 | Brittingham et al. | | 156/175 |
| 5,758,796 A * | 6/1998 | Nishimura et al. | | 220/590 |
| 5,763,027 A * | 6/1998 | Enders et al. | | 428/34.7 |
| 5,797,513 A * | 8/1998 | Olinger et al. | | 220/592.27 |
| 5,822,838 A * | 10/1998 | Seal et al. | | 29/469.5 |
| 5,829,625 A * | 11/1998 | Imagawa | | 220/567.1 |
| 5,971,198 A * | 10/1999 | Olinger et al. | | 220/592.27 |
| 6,145,693 A * | 11/2000 | Berglund | | 220/589 |
| 6,189,723 B1 * | 2/2001 | Davis et al. | | 220/586 |
| 6,401,963 B1 * | 6/2002 | Seal et al. | | 220/586 |
| 6,460,721 B2 * | 10/2002 | Bowen et al. | | 220/586 |
| 6,485,668 B1 * | 11/2002 | Murphy et al. | | 264/516 |
| 6,565,793 B1 * | 5/2003 | Goldsworthy et al. | | 264/516 |
| RE38,433 E * | 2/2004 | Seal et al. | | 29/469.5 |
| 6,708,502 B1 * | 3/2004 | Aceves et al. | | 62/45.1 |
| 6,820,762 B2 * | 11/2004 | Berg, Sr. | | 220/560.03 |
| 6,953,129 B2 * | 10/2005 | DeLay | | 220/589 |
| 7,032,769 B2 * | 4/2006 | Iida et al. | | 220/591 |
| 7,121,423 B2 * | 10/2006 | Sanders | | 220/581 |
| 2003/0111473 A1 * | 6/2003 | Carter et al. | | 220/586 |
| 2004/0060304 A1 * | 4/2004 | Aceves et al. | | 62/45.1 |
| 2004/0182869 A1 * | 9/2004 | Kubo et al. | | 220/581 |
| 2004/0195246 A1 * | 10/2004 | Immel et al. | | 220/560.12 |
| 2004/0206762 A1 * | 10/2004 | Iida et al. | | 220/581 |
| 2006/0163261 A1 * | 7/2006 | Sugiura et al. | | 220/581 |
| 2007/0205201 A1 * | 9/2007 | Cundiff et al. | | 220/591 |
| 2008/0274383 A1 * | 11/2008 | Kanno et al. | | 429/19 |

* cited by examiner

DOUBLE-WALLED CONTAINER HAVING SUPPORTS FOR POSITIONING THE INNER AND OUTER WALLS

BACKGROUND OF THE INVENTION

The invention relates to vessels for cryogenic liquids, which comprise an inner container and an outer container which are positioned with respect to each other and are thermally decoupled from each other by a vacuum insulation layer. Cryogenic liquids are to be understood as meaning liquefied gases, for example helium, nitrogen or oxygen, but in particular hydrogen. Their temperature in the liquid state is only a few degrees Kelvin. Vessels of this type are used in space travel and will also be used in the future in motor vehicle manufacturing. In these applications, a low weight and best possible heat insulation are important.

When used in motor vehicles using hydrogen as fuel, these requirements are extremely applicable because weight increases the masses to be moved and therefore the consumption of fuel. Added to these, however, are also the typical requirements of everyday use, for example those for increased safety and those for particularly good heat insulation. Since it may be possible for a vehicle in every-day use not to be operated for weeks on end, the evaporation losses have to be minimized.

In principle, there are two possibilities for storing liquid hydrogen: in a pressure vessel—in which case the pressure rises due to evaporation; or under atmospheric pressure—in which case the evaporated gas escapes. Evaporation losses have therefore to be minimized in both cases.

Known generic vessels for liquid hydrogen are composed of metal, generally of a light metal. Nevertheless, and despite storage approximately at atmospheric pressure, for reasons concerned with the required, precise assignment of inner and outer containers, and, in the case of the vacuum prevailing in between, for reasons concerned with strength and safety, wall thicknesses are required which continue to make vessels of this type extremely heavy.

Although a container composed of fiber-reinforced material is known from space travel (U.S. Pat. No. 3,392,865), and although its wall is built up from a series of different layers (including an insulation layer and a gas-collecting layer), it does not involve two containers constructed one inside the other.

It is therefore the object of the invention to design a vessel of the generic type in such a manner that, with the lowest possible weight and lowest possible costs in series production, it offers the best possible heat insulation and also satisfies all other safety requirements.

SUMMARY OF THE INVENTION

According to the invention, this is achieved in that inner container and outer container are in each case composed of prepared, fiber-reinforced elements (called "prepregs" in the art) which are in each case wrapped up with a filament and are thereby connected to one another, and in that supports which are also composed of a fiber-reinforced plastic are provided on the inner container for the relative positioning of the inner container with respect to the outer container. In other words: both the outer container and the inner container are each individually composed of fiber-reinforced elements which are each individually held together in such a manner by being wrapped up that they withstand the forces which occur. The supports which are integrated with the inner container in the one or other manner solve the problem of the containers being sufficiently precisely aligned and moveable relative to each other while having different thermal expansions. Owing to the fitting of the supports on the inner container, they can be manufactured precisely in a simple manner and can easily be fitted together. The elements can be assembled in various ways or in a plurality of processing steps to form the particular container.

In a development of the concept of the invention, inner container and outer container in each case comprise parts which are each individually assembled from prepared, fiber-reinforced elements (for example, prepregs or tubes), which parts adjoin one another along specific joining lines and are consequently wrapped up together with a filament. The filament is generally and advantageously the same as the fibers of the elements themselves. The stepwise building up firstly of the individual parts from prepregs and then of the individual container (inner and/or outer container) from the parts results in them being held together particularly well at very low manufacturing costs.

For the wrapping up with the filament, it is advantageous to equip the parts of the inner container and of the outer container at the joining lines with mating surfaces suitable for an adhesive bond. The mating surfaces ensure that the parts are fitted together with dimensional accuracy. No particular demands then have to be imposed on the adhesive bond, since it is used predominantly for holding the parts together up until and while they are being wrapped up.

In one embodiment which satisfies the requirements at particularly low temperatures, the inner container is composed of carbon fibers and the outer container is composed of glass fibers, in each case in a matrix of epoxy resin. Carbon fibers have particularly low thermal conductivity at very low temperatures and glass fibers have the same at room temperature.

In a development of the invention, the supports comprise fiber-reinforced parts which are connected to the fiber-reinforced elements or are integral therewith. The supports can be produced from prepared parts. The supports are fitted on the inner container and are wrapped up together with the fiber-reinforced elements by a filament. The supports are therefore composed of the same material as the inner container, and consequently form virtually no thermal bridges to the outer container and nevertheless ensure the precise positioning of the inner container in the outer container, even at changing temperatures.

In one particularly advantageous embodiment, the supports on the inner container are individual collars built up by repeated wrapping up of the same with fiber-reinforced epoxy resin. Supports which are particularly capable of bearing loads are thus produced all around in a simple manner and without a particular working step. If, like the inner container itself, they are composed of carbon fibers in an epoxy resin matrix, their minimal thermal conductivity means that they also form virtually no thermal bridges. The adjoining parts of the vacuum space between inner container and outer container advantageously contain multilayer insulation which comprises alternating porous and reflecting layers.

Although containers built up according to the invention may be of any desired shape as long as their contour does not have any significant concave surface parts, in one preferred embodiment of the invention the vessel is axially symmetrical, comprising a cylindrical, tubular central part and end domes on both sides. Central part and end domes are assembled in each case from prepared, fiber-reinforced elements and are connected to one another at joining lines situated in planes perpendicular to the axis. The central part is then a pre-manufactured tube and the domes are assembled from prepregs. This shape gives rise to particularly favorable stress ratios, also with regard to the vacuum prevailing between inner and outer containers, and is particularly readily suitable for simple and rapid fitting together.

A further improvement of the force transmission is achieved if, in the case of the inner container, the cylindrical mating surfaces suitable for an adhesive bond are arranged in such a manner that the cylindrical central part overlaps the domes on the inside and, in the case of the outer container, the cylindrical central part overlaps the domes on the outside. This causes the adhesive joints to be subjected to a compressive stress by the vacuum prevailing between inner and outer containers, this increasing their durability, and the subsequent wrapping up under prestress increasing this effect even further.

In one embodiment, which results in a particularly favorable distribution of stress, the supports on the inner container are individual collars built up by repeated wrapping up of the cylindrical central part with fiber-reinforced epoxy resin. In the case of the cylindrical shape, this building up proves particularly simple because it can take place on a wrapping machine without re-clamping with the workpiece. To wrap on a narrow strip in the circumferential direction, all that is required is for the wrapping machine to be operated without axial feed motion. In addition, a collar built up in such a manner is particularly capable of bearing loads, which is desirable in the case of motor vehicles in the event of a collision.

As a result, different thermal expansions can be absorbed without asymmetrical displacement between inner and outer containers. For centering and rotating the workpiece during the wrapping-up operation, the domes have a centering slug in the intercepting point with their axis of symmetry. Said centering slug has for this purpose a central, longitudinally directed aperture through which the contents are also equally fed in and removed and other apparatuses can be introduced into the container. In particular the centering slug of the inner container may also be used for centering the latter with respect to the outer container. The line connections into the interior are thus produced at the point at which minimal relative displacements of the two container walls with respect to each other occur and at the point where it is easiest, because of openings which are already present. As a result, the large surfaces of the container walls also remain free for unimpeded wrapping up, which considerably simplifies the production thereof.

BRIEF DESCRIPTION OF THE DRAWINGS

The invention is described and explained below with reference to figures, in which.

DETAILED DESCRIPTION

Figure 1:
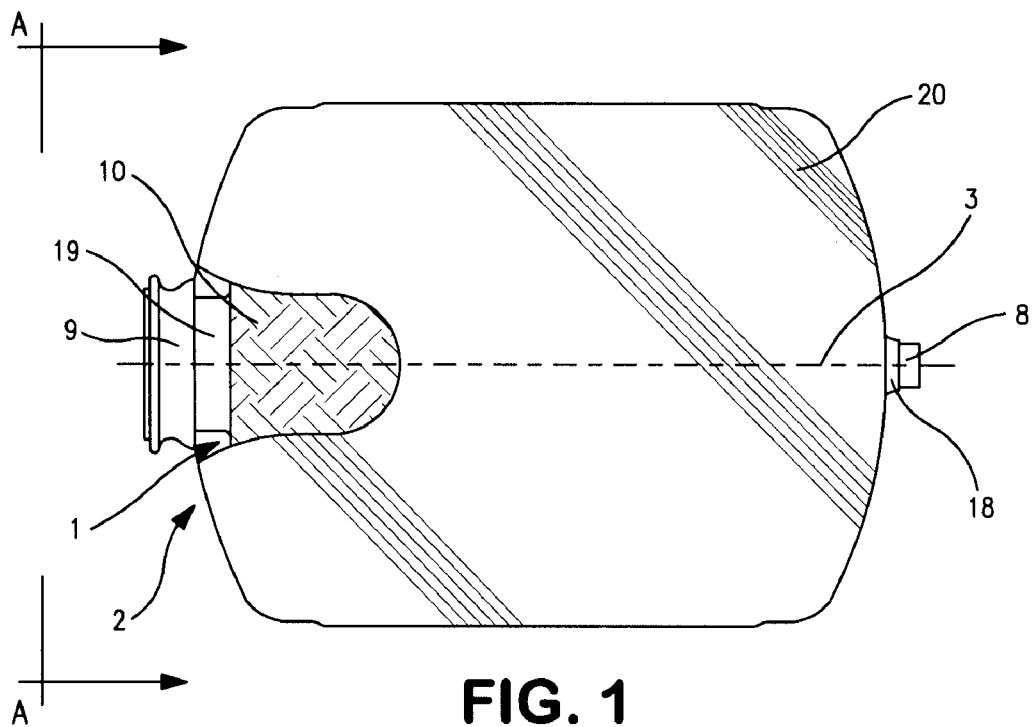
FIG. 1 shows a view of the subject matter of the invention, partially torn open.
Figure 2:
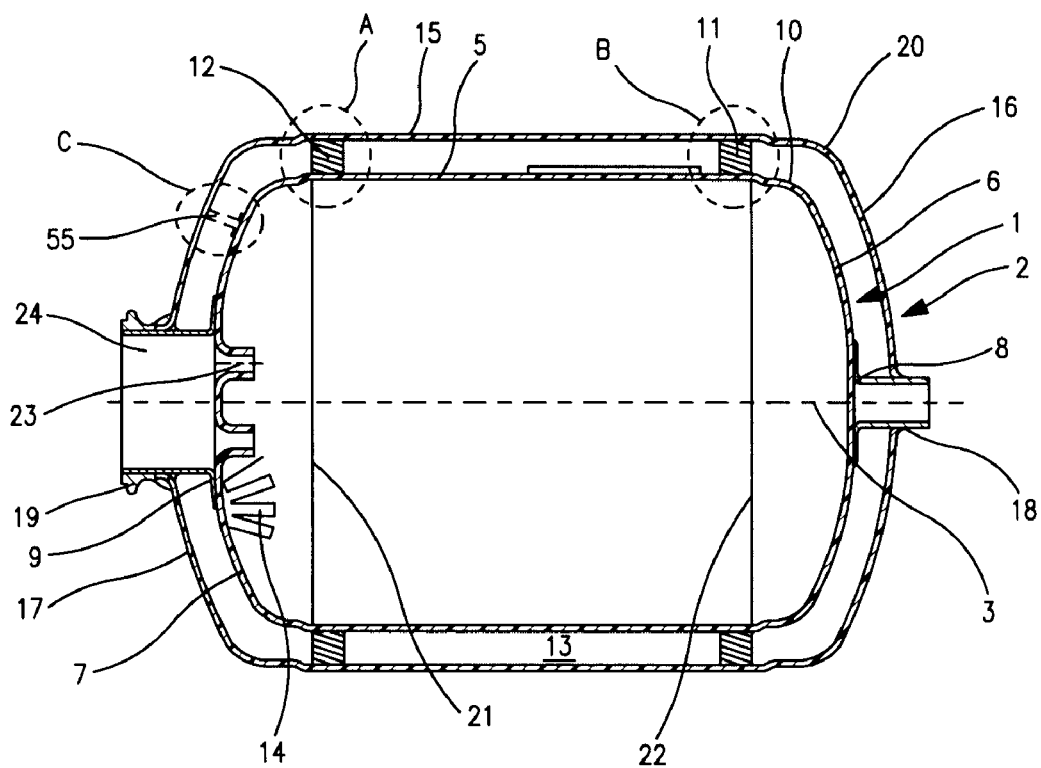
FIG. 2 shows a section according to AA in FIG. 1.

In FIG. 1 and FIG. 2, a container for cryogenic liquids can be seen, the container comprising an inner container, referred to overall by 1, and an outer container, referred to likewise by 2. The vessel may be of virtually any desired design, for example cuboid or case-shaped, or may also be axially symmetrical, in which case 3 is the axis of symmetry. The inner container 1 comprises a central part 5 and end parts 6, 7. These parts 5, 6, 7 are assembled from fiber-reinforced elements or are themselves such elements. For example, the end parts 6, 7 are assembled in a manner known per se from prepared mats 14 (prepregs) which, for their part, are composed of fibers in a plastic—in particular epoxy resin—matrix. For this purpose, these elements 14 are placed into a mold and then compressed under the action of heat to form the part. The central part 5 is essentially cylindrical and may be produced in the same manner. If the central part is a circular cylinder, then a piece of a tube composed of fiber-reinforced plastic may be used. Centering slugs 8, 9 are formed in the end parts 6, 7, preferably already as they are being produced from the elements 14. These three parts are joined to one another along the joining lines 21, 22 and are wrapped up with a filament 10, so that they are held together firmly at all times by this wrapping, with or without a preceding adhesive bond. The centering slugs 8, 9 are already used at this stage for centering in the machine which undertakes the wrapping. A further use arises from the fact that they have longitudinally directed apertures 23, 24 through which the internals are later inserted and the connections to them produced.

The central part 5 is further wrapped up at its ends, where it butts against the end parts 6, 7, but in such a manner that a collar 11, 12 builds up. These collars 11, 12 are used for the subsequent support in the outer container 2. They can be produced virtually in the same working step as the wrapping of the inner container with the filament 10 and form a rigid unit with said container. It goes without saying that this wrapping up with a filament takes place with the addition of a suitable matrix material, here an epoxy resin.

In the same manner, the outer container 2 comprises a central part 15 which is adjoined on both sides by the end parts 16, 17. These end parts are essentially domes, in the case of a circular symmetrical container, they are spherical domes with corresponding transitions. They also have centering slugs 18, 19 on both sides and, after they are joined together, are surrounded with a wrapping 20 composed of a filament. The orientation of the wrapping 20 (like that of the wrapping 10) is selected in the known manner such that both radial and axial forces can be absorbed. A space 13 in which vacuum insulation is provided is thus produced between inner container 1 and outer container 2.

The finished inner container 1 with the collars 11, 12, which are used as the support, is fitted in the outer container 2, which is not yet completely assembled, by said inner container being pushed into the central part 15 of the outer container 2, which part is optionally already connected to one of the two end parts 16, 17, and then the two end parts 16, 17 of the outer container 2 or only the other end part is/are connected to the central part of the outer container. The centering slugs 8, 9 prove useful again here. Only then is the outer container wrapped up with the filament 20. The vessel is then essentially finished.

Figure 3:
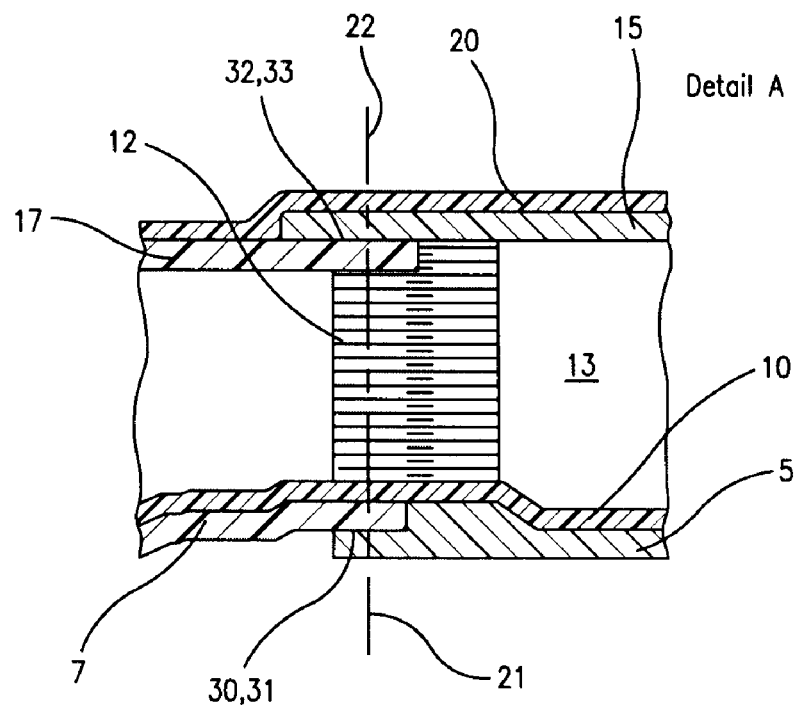
FIG. 3 shows detail A in FIG. 2, enlarged.

An advantageous connection between the central parts 5, 15 and the end parts 6, 7, 16, 17 can be seen more precisely in FIG. 3. The central part 5 of the inner container 1 forms a mating surface 30, which is suitable as adhesive bonding surface, and the end part 7 forms a corresponding mating surface 31 and therefore engages around the central part 5. The central part 15 of the outer container 2 also forms a mating surface 32 which is suitable as an adhesive bonding surface and overlaps a corresponding mating surface 33 of the end part 17. This overlap takes account of the fact that a vacuum prevails in the space between the two containers and, as a result, the central part 5 of the inner container is under internal pressure and the central part 20 of the outer container is under external pressure. Furthermore, the wrapping 10 (only partially indicated in FIG. 2) with a filament can be seen more precisely in FIG. 3. It reaches beyond the joining line 21, 22 and thus connects the central parts 5, 15 to the end parts 7, 17. The adhesive bond between the adhesive bonding surfaces 30, 31 and 32, 33 is therefore primarily an installation aid and may be omitted under some circumstances. It can also be seen in FIG. 3 that the collar 12 is produced from a plurality of layers of a filament strip, simply by wrapping it repeatedly at the same point. Since the fiber-reinforced epoxy resin is a very poor thermal conductor, a connection is thereby produced between inner container 1 and outer container 2, which connection withstands even sharp impact and nevertheless is not a thermal bridge.

Figure 4:
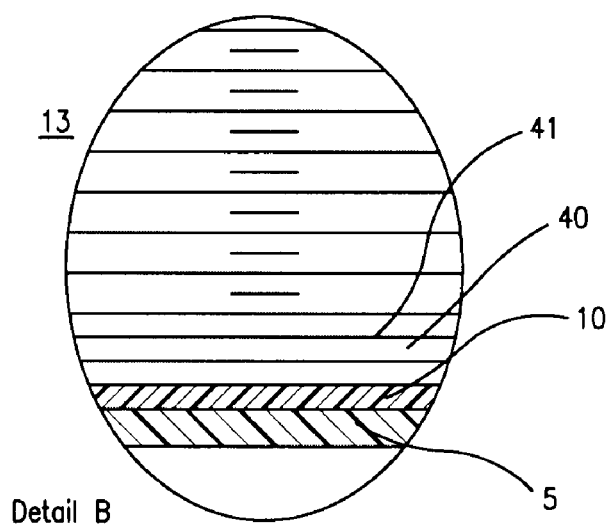
FIG. 4 shows detail B in FIG. 2, enlarged.

FIG. 4 is a diagrammatic and partial depiction of the vacuum insulation in the space 13. Only the central part 5 of the inner container can be seen. It is adjoined on the outside by the wrapping 10, and then by a plurality of following layers of porous layers 40 and reflecting layers, known under the designation multilayer insulation. With these consecutive layers and owing to the vacuum which is also produced in the porous layer, high quality thermal insulation is obtained.

Figure 5:
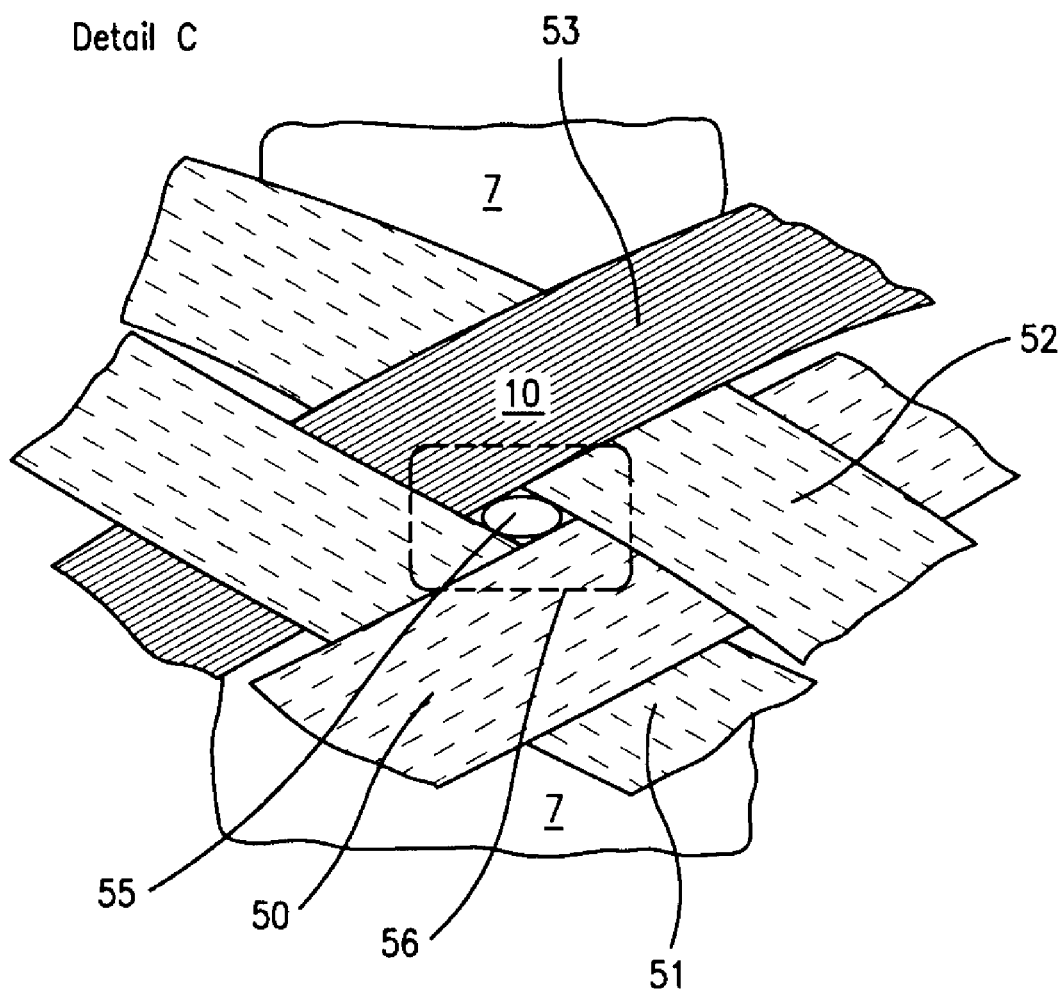
FIG. 5 shows detail C in FIG. 2, enlarged

FIG. 5 shows an alternative embodiment of the support of the inner container 1 in the outer container 2. It is indicated in FIG. 2 by dashed lines and is referred to by 55. The support 55 can be seen in plan view, said support either already being formed integrally with the end part 7 of the inner container 1 during the production thereof or having a flat foot 56 which, before the attachment of the wrapping 10 with the filament, is placed onto the outside of the end part 7 and is connected thereto by the wrapping. The foot 56 is therefore illustrated in FIG. 5 by dashed lines and is situated under the strands 50, 51, 52, 53 produced during the wrapping.

A vessel produced in this manner for cryogenic liquids which are not under pressure manages with very thin wall thicknesses. It is extraordinarily light and rigid, which is of importance when it is used in vehicles, and it nevertheless provides excellent thermal insulation preventing evaporation even over a prolonged stoppage time. A vessel built up in this manner is nevertheless inexpensive to produce, and this not only includes the vessel on its own, but also the installation of the functionally specific "internals". Since all of the connections to them are passed through the centering slugs, said connections can be installed in a particularly simple and expedient manner and it is not necessary to break through the other wall parts for this purpose.

The invention claimed is:

1. A vessel for cryogenic liquids, comprising an inner container and an outer container which are positioned with respect to each other and are thermally decoupled by a vacuum insulation layer, wherein the inner container and the outer container comprise parts composed of prepared, fiber-reinforced elements which are in each case wrapped up together with a filament, wherein the elements of the inner container and the elements of the outer container in each case are thereby connected to one another, and wherein supports comprising a fiber-reinforced plastic are provided on the inner container (1) for the relative positioning of the inner container (1) with respect to the outer container, the inner container and outer container parts adjoin one another along an interface and are wrapped up together with the filament, wherein the parts of the inner container and the parts of the outer container have at the interface cylindrical mating surfaces suitable for an adhesive bond, the inner container and outer container in each case comprising a cylindrical central part and a respective end dome on both sides, wherein the cylindrical central part and end domes are assembled in each case from prepared, fiber-reinforced elements (14) and are connected to one another at the interface situated in planes perpendicular to a longitudinal axis of the cylindrical central part, and, wherein, in the case of the inner container, the cylindrical mating surfaces intended for an adhesive bond are arranged in such a manner that the cylindrical central part overlaps the domes on the inside and, in the case of the outer container, the cylindrical central part overlaps the domes on the outside, wherein the supports on the inner container are individual collars built up by repeatedly wrapping strips of fiber-reinforced epoxy resin around the cylindrical central part of the inner container.

2. The vessel as claimed in claim 1, wherein elements of the inner container comprises carbon fibers and the outer container comprises glass fibers, in each case in an epoxy resin matrix.

3. The vessel as claimed in claim 2, wherein the supports comprise fiber-reinforced plastic which are connected to the elements or are integral therewith.

4. The vessel as claimed in claim 2, wherein the supports are supports which are fitted on the inner container and are wrapped up together with the elements the filament.

5. The vessel as claimed in claim 1, wherein the domes have a centering slug in an intercepting point with their axis of symmetry.

6. The vessel as claimed in claim 5, wherein the centering slug has a central, longitudinally directed aperture.

* * * * *